(12) United States Patent
Qian et al.

(10) Patent No.: US 12,744,210 B2
(45) Date of Patent: Sep. 22, 2026

(54) POSITIVE PLATE AND LITHIUM-ION BATTERY

(71) Applicant: SHENZHEN CAPCHEM TECHNOLOGY CO., LTD., Shenzhen (CN)

(72) Inventors: Yunxian Qian, Shenzhen (CN); Shiguang Hu, Shenzhen (CN); Yonghong Deng, Shenzhen (CN); Hongmei Li, Shenzhen (CN); Xiaoxia Xiang, Shenzhen (CN); Yong Wang, Shenzhen (CN); Zhaohua Zhang, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 717 days.

(21) Appl. No.: 18/251,436

(22) PCT Filed: Mar. 10, 2023

(86) PCT No.: PCT/CN2023/080937
§ 371 (c)(1),
(2) Date: May 2, 2023

(87) PCT Pub. No.: WO2023/174185
PCT Pub. Date: Sep. 21, 2023

(65) Prior Publication Data

US 2024/0313213 A1 Sep. 19, 2024

(30) Foreign Application Priority Data

Mar. 17, 2022 (CN) ........................ 202210266013.8

(51) Int. Cl.
*H01M 4/525* (2010.01)
*H01M 4/02* (2006.01)
(Continued)

(52) U.S. Cl.
CPC .......... *H01M 4/525* (2013.01); *H01M 4/131* (2013.01); *H01M 4/366* (2013.01); *H01M 4/628* (2013.01);
(Continued)

(58) Field of Classification Search
CPC ...... H01M 4/525; H01M 4/131; H01M 4/366; H01M 4/628; H01M 4/13; H01M 4/02;
(Continued)

(56) References Cited

U.S. PATENT DOCUMENTS

| | | | | |
|---|---|---|---|---|
| 2016/0036057 A1* | 2/2016 | Tsukagoshi ....... | H01M 10/4235 429/215 |
| 2019/0103633 A1* | 4/2019 | Shi .................... | H01M 10/0567 |
| 2022/0149435 A1* | 5/2022 | Sawa ............... | H01M 10/0525 |

FOREIGN PATENT DOCUMENTS

| | | |
|---|---|---|
| CN | 102738503 | 10/2012 |
| CN | 103762334 | 4/2014 |

(Continued)

OTHER PUBLICATIONS

Electrode for lithium-ion battery and lithium-ion battery comprising electrode; Shenzhen capchem technology Co Ltd; Feb. 4, 2021 (Year: 2021).*

(Continued)

*Primary Examiner* — Adam J Francis
(74) *Attorney, Agent, or Firm* — Hodgson Russ LLP

(57) ABSTRACT

A positive electrode sheet includes a positive electrode current collector and a positive electrode material layer formed on the positive electrode current collector. The positive electrode material layer includes a high-nickel positive electrode material represented by formula I and a compound represented by formula II: $Li_aNi_qCo_yM_zO_2$, Formula I, where $0.9 \le a \le 1.2$, $0.7 \le q \le 1$, $y \ge 0$, $z \ge 0$, and $q+y+z=1$.
(Continued)

M is selected from one or both of Mn and Al. $R_1$, $R_2$, and $R_3$ are each independently selected from an alkyl group of 1 to 5 carbon atoms, a fluoroalkyl group of 1 to 5 carbon atoms, an ether group of 1 to 5 carbon atoms, a fluoroether group of 1 to 5 carbon atoms, an unsaturated hydrocarbonyl group of 2 to 5 carbon atoms.

Formula II

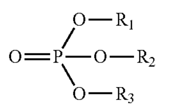

20 Claims, 1 Drawing Sheet

(51) Int. Cl.

| | |
|---|---|
| ***H01M 4/131*** | (2010.01) |
| ***H01M 4/36*** | (2006.01) |
| ***H01M 4/62*** | (2006.01) |
| ***H01M 10/0525*** | (2010.01) |
| ***H01M 10/0567*** | (2010.01) |

(52) U.S. Cl.

CPC ... *H01M 10/0525* (2013.01); *H01M 10/0567* (2013.01); *H01M 2004/021* (2013.01); *H01M 2004/028* (2013.01); *H01M 2300/0025* (2013.01)

(58) Field of Classification Search

CPC ......... H01M 10/0525; H01M 10/0567; H01M 10/0568; H01M 10/4235; H01M 10/42; H01M 10/36; H01M 10/62; H01M 2004/021; H01M 2004/028; H01M 2300/0017; H01M 2300/0025

See application file for complete search history.

(56) References Cited

FOREIGN PATENT DOCUMENTS

| | | | |
|---|---|---|---|
| CN | 104471780 | 3/2015 | |
| CN | 105322174 | 2/2016 | |
| CN | 106898827 | 6/2017 | |
| CN | 106953118 | 7/2017 | |
| CN | 108110317 | 6/2018 | |
| CN | 109841908 | 6/2019 | |
| CN | 112382752 | 2/2021 | |
| CN | 113644275 | 11/2021 | |
| CN | 113972366 | 1/2022 | |
| CN | 114023965 | 2/2022 | |
| CN | 114843512 | 8/2022 | |
| CN | 114883519 | 8/2022 | |
| EP | 4273969 | 11/2023 | |
| JP | 2002270184 | 9/2002 | |
| JP | 2016122550 | 7/2016 | |
| KR | 20180050780 | 5/2018 | |
| WO | WO-2021018243 A1 * | 2/2021 | ........ H01M 10/0567 |

OTHER PUBLICATIONS

WIPO, International Search Report and Written Opinion for PCT/CN2023/080937, May 31, 2023.

CNIPA, First Office Action for CN Application No. 202210266013.8, Dec. 7, 2023.

EPO, Extended European Search Report for EP Application No. 23723399.4, Jun. 12, 2025.

* cited by examiner

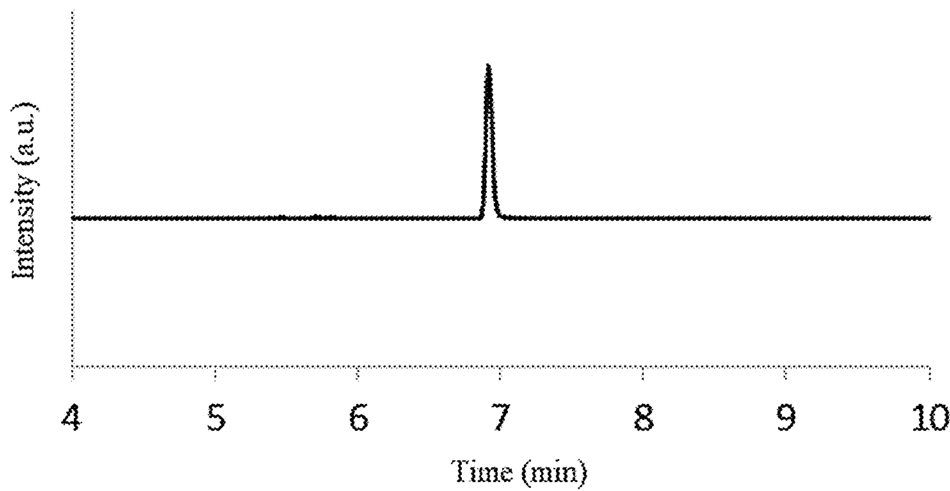
LC-MS chromatogram
Intensity (a.u.)
4
5
6
7
8
9
10
Time (min)

POSITIVE PLATE AND LITHIUM-ION BATTERY

CROSS-REFERENCE TO RELATED APPLICATIONS

The present application is a national phase entry under 35 U.S.C. § 371 of International Application PCT/CN2023/080937, filed Mar. 10, 2023, which claims priority to Chinese Patent Application No. 202210266013.8, filed Mar. 17, 2022, the entire disclosures of which are incorporated herein by reference.

TECHNICAL FIELD

The present disclosure generally relates to a technical field of energy storage electronics, and more particularly to a positive electrode sheet and a lithium-ion battery.

BACKGROUND

Due to their advantages of a high working voltage, a low self-discharge, a long cycle life, no memory effect, an environmental friendliness, a good safety performance and so on, lithium-ion batteries have rapidly occupied consumer electronics market and rapidly expanded in a field of power storage. With the application of the lithium-ion batteries in electric vehicles, large energy storage stations, mobile energy storage devices and so on, it is extremely urgent to further improve an energy density and a safety performance of the lithium-ion batteries.

A high-nickel positive electrode material has become a hotspot of research and application due to a higher theoretical specific capacity than other positive electrode active materials. However, in use, catalysis and surface effects of transition metal ions at an interface of the high-nickel positive electrode material cause significant oxidation and decomposition reactions to occur in conventional electrolytes, resulting in deterioration of an electrochemical performance of the battery. In addition, a delithiation capacity of the high-nickel positive electrode material is greater. Therefore, it will lead to a poor structural stability, and lead to interfacial side reactions caused by a dissolution of transition metals in reduction reactions, thereby increasing a risk of the lithium-ion batteries.

In view of the above-mentioned problems of the high-nickel material, common processes are currently used to introduce a film-forming additive into an electrolyte to passivate a surface of the high-nickel positive electrode material, reduce side reactions and improve cycling performance; introduce an anti-overcharge additive, a flame retardant additive and other functional additives into the electrolyte to improve the safety performance. However, it is difficult to take into account a comprehensive performance of impedance, cycling and safety of lithium-ion batteries by introducing the film-forming additive as well as the anti-overcharge additive, the flame retardant additive and other functional additives into the electrolyte.

SUMMARY

In a first aspect, the present disclosure provides a positive electrode sheet, including a positive electrode current collector and a positive electrode material layer formed on the positive electrode current collector, in which the positive electrode material layer includes a high-nickel positive electrode material represented by formula I and a compound represented by formula II:

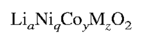

Formula I where $0.9 \leq a \leq 1.2$, $0.7 \leq q \leq 1$, $y \geq 0$, $z \geq 0$, and $q+y+z=1$, in which M is selected from one or both of Mn and Al;

Formula II

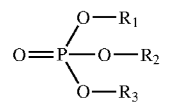

where $R_1$, $R_2$, and $R_3$ are each independently selected from an alkyl group of 1 to 5 carbon atoms, a fluoroalkyl group of 1 to 5 carbon atoms, an ether group of 1 to 5 carbon atoms, a fluoroether group of 1 to 5 carbon atoms, an unsaturated hydrocarbonyl group of 2 to 5 carbon atoms, and at least one of $R_1$, $R_2$, and $R_3$ is the unsaturated hydrocarbonyl group of 2 to 5 carbon atoms;

in which the positive electrode sheet satisfies following conditions;

$$0.05 \leq (b/10)*(h/x) \leq 15;$$

and $$0.005 \leq b \leq 1,$$

$$0.7 \leq x \leq 1,$$

$$80 \leq h \leq 140;$$

where b is a mass percent content of the compound represented by the formula II in the positive electrode material layer, in a unit of %;

x is a molar ratio of Ni element: (Ni element+Co element+M element) in the high-nickel positive electrode material; and h is a thickness of the positive electrode material layer on one side of the positive electrode current collector, in a unit of μm;

in which a solution obtained after ultrasonically shaking the positive electrode sheet in a solvent is subjected to a liquid chromatography-mass spectrometer (LC-MS) analysis, and a characteristic peak appears in a region having a retention time of 6.5 min to 7.5 min.

In some embodiments, the positive electrode sheet satisfies a following condition:

$$0.08 \leq (b/10)*(h/x) \leq 8.$$

In some embodiments, the mass percent content b of the compound represented by the formula II in the positive electrode material layer is from 0.05% to 0.5%.

In some embodiments, the molar ratio x of Ni element: (Ni element+Co element+M element) in the high-nickel positive electrode material is from 0.8 to 0.9.

In some embodiments, the thickness h of the positive electrode material layer on one side of the positive electrode current collector is from 100 to 140 μm.

In some embodiments, the high-nickel positive electrode material represented by the formula I is selected from at least one of $LiNi_{0.8}Co_{0.1}Mn_{0.1}O_2$, $LiNi_{0.8}Co_{0.1}Al_{0.1}O_2$, $LiNi_{0.81}Co_{0.16}Mn_{0.03}O_2$, $LiNi_{0.81}Co_{0.16}Al_{0.03}O_2$, $LiNi_{0.8}Co_{0.05}Mn_{0.15}O_2$, $LiNi_{0.8}Co_{0.05}Al_{0.15}O_2$, $LiNi_{0.7}Co_{0.1}Mn_{0.2}O_2$, $LiNi_{0.9}Co_{0.05}Mn_{0.05}O_2$, $LiNiO_2$, $LiNi_{0.75}Mn_{0.25}O_2$, or $LiNi_{0.85}Co_{0.05}Mn_{0.1}O_2$.

In some embodiments, the mass percent content b of the high-nickel positive electrode material represented by the formula I in the positive electrode material layer is from 90.0% to 99.2%.

In some embodiments, the alkyl group of 1 to 5 carbon atoms is selected from methyl, ethyl, n-propyl, isopropyl, n-butyl, isobutyl, sec-butyl, tert-butyl, n-pentyl, isopentyl, sec-pentyl, or neopentyl: the fluoroalkyl group of 1 to 5 carbon atoms is selected from a group obtained by substituting one or more hydrogen elements in the alkyl group of 1 to 5 carbon atoms with fluorine elements:

the unsaturated hydrocarbonyl group of 2 to 5 carbon atoms is selected from vinyl, propenyl, allyl, butenyl, pentenyl, methyl vinyl, methyl allyl, ethynyl, propynyl, propargyl, butynyl, or pentynyl;

the ether group of 1 to 5 carbon atoms is selected from methyl ether, ethyl ether, methyl ethyl ether, propyl ether, methyl propyl ether, or ethyl propyl ether;

the fluoroether group of 1 to 5 carbon atoms is selected from fluoromethyl ether, fluoroethyl ether, fluoromethyl ethyl ether, fluoropropyl ether, fluoromethyl propyl ether, or fluoroethyl propyl ether.

In some embodiments, the compound represented by the formula II is selected from at least one of tripropargyl phosphate, dipropargyl methyl phosphate, dipropargyl fluoromethyl phosphate, dipropargyl methoxy methyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, dipropargyl methyl ether phosphate, dipropargyl fluoromethyl ether phosphate, diallyl 2,2,2-trifluoroethyl phosphate, diallyl 3,3,3-trifluoropropyl phosphate, or diallyl hexafluoroisopropyl phosphate.

In a second aspect, the present disclosure provides a lithium-ion battery, including: a negative electrode sheet, a non-aqueous electrolyte, and the above-mentioned positive electrode sheet.

BRIEF DESCRIPTION OF THE DRAWINGS

FIG. 1 is a chromatogram of a positive electrode sheet provided in the present disclosure subjected to a liquid chromatography-mass spectrometer (LC-MS).

DETAILED DESCRIPTION

In order that the technical problems, technical solutions and advantageous effects to be solved by the present disclosure can be more clearly understood, the present disclosure will be described in further detail with reference to the accompanying drawings and the embodiments. It should be understood that the particular embodiments described herein are only used to explain the present disclosure, but are not intended to limit the present disclosure.

An embodiment of the present disclosure provides a positive electrode sheet including a positive electrode current collector and a positive electrode material layer formed on the positive electrode current collector. The positive electrode material layer includes a high-nickel positive electrode material represented by formula I and a compound represented by formula II:

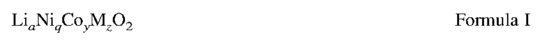

where $0.9 \leq a \leq 1.2$, $0.7 \leq q \leq 1$, $y \geq 0$, $z \geq 0$, and $q+y+z=1$, in which M is selected from one or both of Mn and Al;

Formula II

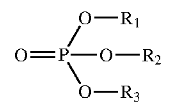

where $R_1$, $R_2$, and $R_3$ are each independently selected from an alkyl group of 1 to 5 carbon atoms, a fluoroalkyl group of 1 to 5 carbon atoms, an ether group of 1 to 5 carbon atoms, a fluoroether group of 1 to 5 carbon atoms, an unsaturated hydrocarbonyl group of 2 to 5 carbon atoms, and at least one of $R_1$, $R_2$, and $R_3$ is the unsaturated hydrocarbonyl group of 2 to 5 carbon atoms.

The positive electrode sheet satisfies following conditions:

$$0.05 \leq (b/10) * (h/x) \leq 15;$$

and $$0.005 \leq b \leq 1,$$

$$0.7 \leq x \leq 1,$$

$$80 \leq h \leq 140;$$

where b is a mass percent content of the compound represented by the formula II in the positive electrode material layer, in a unit of %;

x is a molar ratio of Ni element: (Ni element+Co element+M element) in the high-nickel positive electrode material; and h is a thickness of the positive electrode material layer on one side of the positive electrode current collector, in a unit of μm.

A solution obtained after ultrasonically shaking the positive electrode sheet in a solvent is subjected to a liquid chromatography-mass spectrometer (LC-MS) analysis, and a characteristic peak appears in a region having a retention time of 6.5 min to 7.5 min.

The method of performing the liquid chromatography-mass spectrometer chromatographic analysis on the positive electrode sheet is as follows: the battery is disassembled in a glove box and the positive electrode sheet is taken out. Then the cut positive electrode sheet is immersed in a suitable solvent (such as DMC, or acetonitrile), and subjected to ultrasonic vibration for a suitable time to dissolve the substance in the positive electrode material layer of the positive electrode sheet into the solvent. Then, the solution is detected by the liquid chromatography-mass spectrometer (LC-MS), and has a characteristic peak in a region of a retention time of 6.5 min to 7.5 min, as shown in FIG. 1. The model of the liquid chromatography-mass spectrometer is Waters ACQUITY UPLC/Xevo G2-XS Qtof MS. The chromatographic conditions are as follows: a Waters T3 type chromatographic column is used, the column temperature is from 35 to 40° C., a mobile phase is a mixture of 40% water and 60% acetonitrile, and the flow rate of the mobile phase is from 0.2 to 0.3 mL/min.

In some embodiments, the duration of ultrasonic vibration of the positive electrode sheet in the solvent is 2 hours or more.

In the present disclosure, the alkyl group of 1 to 5 carbon atoms can be selected from, for example, methyl, ethyl, n-propyl, isopropyl, n-butyl, isobutyl, sec-butyl, tert-butyl, n-pentyl, isopentyl, sec-pentyl, or neopentyl. The fluoroalkyl group of 1 to 5 carbon atoms is selected from a group obtained by substituting one or more hydrogen elements in the alkyl group of 1 to 5 carbon atoms with fluorine elements.

The unsaturated hydrocarbonyl group of 2 to 5 carbon atoms can be selected from, for example, vinyl, propenyl, allyl, butenyl, pentenyl, methyl vinyl, methyl allyl, ethynyl, propynyl, propargyl, butynyl, or pentynyl.

The ether group of 1 to 5 carbon atoms can be selected from, for example, methyl ether, ethyl ether, methyl ethyl ether, propyl ether, methyl propyl ether, or ethyl propyl ether.

The fluoroether group of 1 to 5 carbon atoms can be selected from, for example, fluoromethyl ether, fluoroethyl ether, fluoromethyl ethyl ether, fluoropropyl ether, fluoromethyl propyl ether, or fluoroethyl propyl ether.

The compound represented by the formula II is added into the positive electrode material layer, and the compound represented by the formula II can form an effective interfacial film in situ on the surface of the high-nickel positive electrode material, so that it is possible to take into account low impedance, cycling and safety performance of the battery. The inventors found through a lot of research that by rationally designing the mass percent content b of the compound represented by the formula II in the positive electrode material layer, the molar ratio x of the Ni element: (Ni element+Co element+M element) in the high-nickel positive electrode material and the thickness h of the positive electrode material layer on one side of the positive electrode current collector to satisfy the condition $0.05 \leq (b/10)*(h/x) \leq 15$, the synergistic effect of the compound represented by the formula II with the high-nickel positive electrode material and the thickness of the positive electrode material layer can be exerted sufficiently. Thus, the high-nickel positive electrode material has relatively high structural stability and oxidation resistance, which can unexpectedly and significantly suppress the decomposition reaction of the electrolyte after high-temperature charging, thereby improving the cycling and impedance performance of the battery.

In preferred embodiments, the positive electrode sheet satisfies a following condition:

$$0.08 \leq (b/10)*(h/x) \leq 8.$$

When the mass percent content b of the compound represented by the formula II in the positive electrode material layer, the molar ratio x of the Ni element: (Ni element+Co element+M element) in the high-nickel positive electrode material and the thickness h of the positive electrode material layer on one side of the positive electrode current collector satisfy the above condition, the cycling performance of the battery can be further improved and the battery impedance can be further reduced.

According to embodiments of the present disclosure, the mass percent content b of the compound represented by the formula II in the positive electrode material layer is from 0.005% to 1%. In specific embodiments, the mass percent content b of the compound represented by the formula II in the positive electrode material layer can be 0.005%, 0.008%, 0.01%, 0.02%, 0.04%, 0.08%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1%.

In preferred embodiments, the mass percent content b of the compound represented by the formula II in the positive electrode material layer is from 0.05% to 0.5%.

When the compound represented by the formula II is used as an electrolyte additive, it will simultaneously form films on the surfaces of the positive electrode and the negative electrode, resulting in an increase in the internal resistance of the battery. In order to solve this problem, in the present disclosure, the compound represented by the formula II is added to the positive electrode material layer, and the interfacial film formed by the compound represented by the formula II on the surface of the high-nickel positive electrode material can effectively inhibit the electrochemical oxidation reaction between the electrolyte and the high-nickel positive electrode material. This greatly reduces the oxygen release of the high-nickel positive electrode material, and improves the oxidation resistance and structural stability of the active material. At the same time, due to its own phosphorus-containing functional group, film formation on the surface of the high-nickel positive electrode material will improve safety performance. Therefore, on the one hand, using the compound represented by the formula I as a positive electrode slurry additive can retain its passivation effect on the high-nickel positive electrode material, improve the oxidation resistance and structural stability of the positive electrode, and thus improve the electrochemical performance and safety performance of the lithium-ion battery. On the other hand, this can also overcome the problem of the increase in the internal resistance of the battery caused by the simultaneous film-forming reaction on the positive and negative electrodes when it is used as an electrolyte additive in the related art.

In the positive electrode material layer, if the content of the compound represented by the formula II is too small, then its passivation effect on the positive electrode material is limited, so that the effect of improving the battery performance is not apparent. Otherwise, if the content of the compound represented by the formula II is too large, the film will be too thick on the surface of the positive electrode active material, which will increase the internal resistance of the battery.

According to embodiments of the present disclosure, the molar ratio x of Ni element: (Ni element+Co element+M element) in the high-nickel positive electrode material is from 0.7 to 1. In specific embodiments, the molar ratio x of Ni element: (Ni element+Co element+M element) in the high-nickel positive electrode material can be 0.7, 0.72, 0.75, 0.78, 0.8, 0.82, 0.85, 0.88, 0.9, 0.92, 0.95, 0.98 or 1.

In preferred embodiments, the molar ratio x of Ni element: (Ni element+Co element+M element) in the high-nickel positive electrode material is from 0.8 to 0.9.

The proportion of the Ni element in the high-nickel positive electrode material is an important factor affecting the theoretical specific capacity of the positive electrode active material. When the content of the Ni element in the high-nickel positive electrode material is relatively high, its theoretical specific capacity is also higher, but its oxidation reaction with the electrolyte is also stronger. In the present disclosure, it is possible to effectively reduce the adverse effect of the nickel element in the positive electrode on the stability of the positive electrode active material and the non-aqueous electrolyte by controlling the content of the compound represented by the formula II in the positive electrode material layer and the thickness of the positive electrode material layer on one side of the positive electrode current collector. When the proportion of the Ni element in the high-nickel positive electrode material is relatively low: the theoretical specific capacity of the positive electrode material layer is relatively low; which is not conducive to the increase in the energy density of the battery. When the proportion of the Ni element in the high-nickel positive electrode material is too high, it is unfavorable to the stability of the positive electrode and the non-aqueous electrolyte, resulting in a decrease in the high-temperature cycling performance of the battery and a decrease in safety performance.

According to embodiments of the present disclosure, the thickness h of the positive electrode material layer on one side of the positive electrode current collector is from 80 to 140 μm. In specific embodiments, the thickness h of the positive electrode material layer on one side of the positive electrode current collector can be 80 μm, 83 μm, 86 μm, 90 μm, 93 μm, 96 μm, 100 μm, 103 μm, 106 μm, 110 μm, 113 μm, 116 μm, 120 μm, 123 μm, 126 μm, 130 μm, 133 μm, 136 μm or 140 μm.

In preferred embodiments, the thickness h of the positive electrode material layer on one side of the positive electrode current collector is from 100 to 140 μm.

The thickness of the positive electrode material layer is also a key technical parameter in the design and manufacture of the lithium-ion battery. Under the same electrode sheet size, the greater the thickness of the positive electrode material layer, although the energy density of the battery increases, the internal resistance will also increase. While the thickness of the positive electrode material layer decreases, the energy density of the battery decreases, which is not conducive to commercialization application.

In some embodiments, the high-nickel positive electrode material represented by the formula I is selected from at least one of $LiNi_{0.8}Co_{0.1}Mn_{0.1}O_2$, $LiNi_{0.8}Co_{0.1}Al_{0.1}O_2$, $LiNi_{0.81}Co_{0.16}Mn_{0.03}O_2$, $LiNi_{0.81}Co_{0.16}Al_{0.03}O_2$, $LiNi_{0.8}Co_{0.05}Mn_{0.15}O_2$, $LiNi_{0.8}Co_{0.05}Al_{0.15}O_2$, $LiNi_{0.7}Co_{0.1}Mn_{0.2}O_2$, $LiNi_{0.9}Co_{0.05}Mn_{0.05}O_2$, $LiNiO_2$, $LiNi_{0.75}Mn_{0.25}O_2$, or $LiNi_{0.85}Co_{0.05}Mn_{0.1}O_2$.

In some embodiments, the mass percent content b of the high-nickel positive electrode material represented by the formula I in the positive electrode material layer is from 90.0% to 99.2%.

In some embodiments, the compound represented by the formula II is selected from at least one of tripropargyl phosphate, dipropargyl methyl phosphate, dipropargyl fluoromethyl phosphate, dipropargyl methoxymethyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, dipropargyl methyl ether phosphate, dipropargyl fluoromethyl ether phosphate, 2,2,2-trifluoroethyl diallyl phosphate, diallyl 3,3,3-trifluoropropyl phosphate, or diallyl hexafluoroisopropyl phosphate.

In preferred embodiments, the compound represented by the formula II is selected from one or more of following compounds:

Compound 1

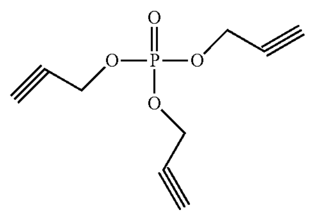

Compound 2

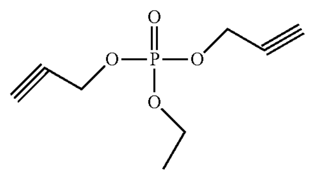

Compound 3

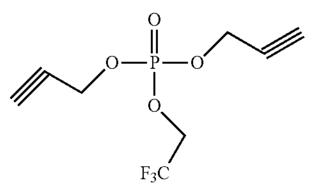

Compound 4

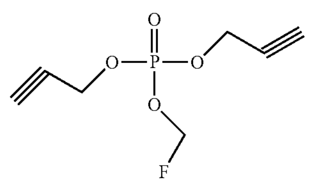

Compound 5

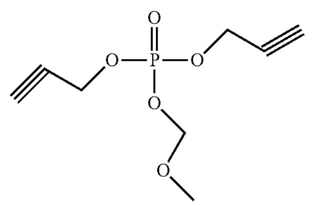

Compound 6

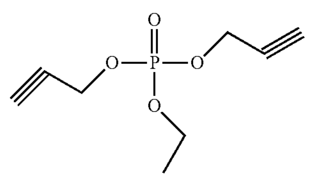

In some embodiments, the positive electrode material layer further includes a positive electrode binder and a positive electrode conductive agent. The positive electrode active material, the compound represented by the formula II, the positive electrode binder and the positive electrode conductive agent are blended to obtain the positive electrode material layer.

With a total mass of the positive electrode material layer being 100%, a mass percent content of the positive electrode binder is from 1 to 2%, and a mass percent content of the positive electrode conductive agent is from 0.5 to 2%.

The positive electrode binder includes one or more of thermoplastic resins such as polyvinylidene fluoride, vinylidene fluoride copolymers, polytetrafluoroethylene, vinylidene fluoride-hexafluoropropylene copolymers, tetrafluoroethylene-hexafluoropropylene copolymers, tetrafluoroethylene-perfluoroalkyl vinyl ether copolymers, ethylene-tetrafluoroethylene copolymers, vinylidene fluoridetetrafluoroethylene copolymers, vinylidene fluoride-trifluoroethylene copolymers, vinylidene fluoride-trichloroethylene copolymers, vinylidene fluoride-fluoroethylene copolymers, vinylidene fluoride-hexafluoropropylene-tetrafluoroethylene copolymers, thermoplastic polyimides, polyethylene and polypropylene and so on; acrylic resins; sodium carboxymethyl cellulose; polyvinyl butyral; ethylene-vinyl acetate copolymers; polyvinyl alcohol; and styrene butadiene rubbers.

The positive electrode conductive agent includes one or more of conductive carbon black, conductive carbon spheres, conductive graphite, conductive carbon fibers, carbon nanotubes, graphene or reduced graphene oxide.

In some embodiments, the compound represented by the formula II is formed on the surface of the positive electrode material layer, or the compound represented by the formula II is mixed in the interior of the positive electrode material layer.

When the compound represented by the formula II is formed on the surface of the positive electrode material layer, its preparation method can be a method as follows:

A coating containing the compound represented by the formula II is formed on a surface of the positive electrode material layer by means of surface coating. Specifically, the positive electrode active material, the positive electrode conductive agent and the positive electrode binder can be dispersed in an organic solvent firstly, preparing a positive electrode slurry. The positive electrode slurry is coated and dried to form the positive electrode material layer. Then the compound represented by the formula II is dispersed in an organic solvent, and the obtained solution of the compound represented by the formula II is sprayed on the surface of the positive electrode material layer. After drying it to remove the solvent, the positive electrode material layer including the compound represented by the formula II is obtained.

When the compound represented by the formula II is mixed in the interior of the positive electrode material layer, its preparation method can be a method as follows:

1) A positive electrode slurry for preparing the positive electrode material layer contains the compound represented by the formula II. Specifically, the compound represented by the formula II, the positive electrode active material, the positive electrode conductive agent and the positive electrode binder can be dispersed in an organic solvent, preparing the positive electrode slurry. Then, the positive electrode slurry is coated and dried to form the positive electrode material layer.
2) After preparing the positive electrode material layer, the positive electrode material layer is soaked in a solution containing the compound represented by the formula II, so that the compound represented by the formula II penetrates into the interior of the positive electrode material layer. After drying it to remove the solvent, the positive electrode material layer including the compound represented by the formula II is obtained.

In some embodiments, the positive electrode sheet further includes a positive electrode current collector, and the positive electrode material layer is formed on a surface of the positive electrode current collector.

The positive electrode current collector is selected from metal materials that can conduct electrons. Preferably, the positive electrode current collector includes one or more of Al, Ni, tin, copper, and stainless steel. In more preferred embodiments, the positive current collector is selected from aluminum foil.

Another embodiment of the present disclosure provides a lithium-ion battery including a negative electrode sheet, a non-aqueous electrolyte, and the above-mentioned positive electrode sheet.

In some embodiments, the non-aqueous electrolyte includes a non-aqueous organic solvent, and the non-aqueous organic solvent includes one or more of an ether solvent, a nitrile solvent, a carbonate solvent, and a carboxylate solvent.

In some embodiments, the ether solvent includes cyclic ethers or linear ethers, preferably linear ethers with 3 to 10 carbon atoms and cyclic ethers with 3 to 6 carbon atoms. The cyclic ethers can specifically be, but are not limited to, one or more of 1,3-dioxolane (DOL), 1,4-dioxane (DX), crown ethers, tetrahydrofuran (THF), 2-methyl tetrahydrofuran (2-CH3-THF), and 2-trifluoromethyl tetrahydrofuran (2-CF3-THF); and the linear ethers can specifically be, but are not limited to, dimethoxymethane, diethoxymethane, ethoxymethoxymethane, ethylene glycol di-n-propyl ether, ethylene glycol di-n-butyl ether, and diethylene glycol dimethyl ether. Dimethoxymethane, diethoxymethane, and ethoxymethoxymethane, which are low in viscosity and impart high ion conductivity, are particularly preferred because the solvation ability of linear ethers with lithium ions is high and ion dissociation can be improved. One kind of ether compound may be used alone, or two or more kinds of ether compounds may be used in any combination and ratio. The addition amount of the ether compounds is not particularly limited, and it is arbitrary within a range of not significantly destroying the effect of the high-compacted lithium-ion battery in the present disclosure. The addition amount of the ether compounds is usually 1% or more by volume, preferably 2% or more by volume, more preferably 3% or more by volume, in addition, usually 30% or less by volume, preferably 25% or less by volume, more preferably 20% or less by volume of the ether compounds in the non-aqueous solvent of 100% by volume. When two or more ether compounds are used in combination, the total amount of the ether compounds needs to satisfy the above ranges. When the addition amount of the ether compounds is within the above-mentioned preferred ranges, it is easy to ensure the effect of improving the ion conductivity by increasing the lithium-ion dissociation degree of the chain ethers and reducing the viscosity. In addition, when the negative electrode active material is a carbon material, co-intercalation of the chain ethers and lithium ions can be suppressed, so that input-output characteristics and charge-discharge rate characteristics can be brought into appropriate ranges.

In some embodiments, the nitrile solvent may specifically be, but is not limited to, one or more of acetonitrile, glutaronitrile, and malononitrile.

In some embodiments, the carbonate solvent includes cyclic carbonates or linear carbonates, the cyclic carbonates can specifically be, but are not limited to, one or more of ethylene carbonate (EC), propylene carbonate (PC), γ-butyrolactone (GBL), and butylene carbonate (BC); and the linear carbonates can specifically be, but are not limited to, one or more of dimethyl carbonate (DMC), ethyl methyl carbonate (EMC), diethyl carbonate (DEC), and dipropyl carbonate (DPC). The content of the cyclic carbonates is not particularly limited, and it is arbitrary within a range of not significantly destroying the effect of the lithium-ion battery in the present disclosure. However, in the case of using one kind of cyclic carbonate alone, the lower limit of the content of the cyclic carbonates is usually 3% or more by volume, and preferably 5% or more by volume, relative to the total amount of the solvent in the non-aqueous electrolyte. By setting this range, it is possible to avoid a decrease in conductivity due to a decrease in the dielectric constant of the non-aqueous electrolyte, and it is easy to make the large-current discharge characteristics, stability with respect to the negative electrode, and cycle characteristics of the non-aqueous electrolyte battery reach good ranges. In addition, the upper limit is usually 90% or less by volume, preferably 85% or less by volume, and more preferably 80% or less by volume. By setting this range, the oxidation/reduction resistance of the non-aqueous electrolyte can be improved, thereby contributing to the improvement of the stability during high-temperature storage. The content of the linear carbonates is not particularly limited, but is usually 15% or more by volume, preferably 20% or more by volume, and more preferably 25% or more by volume relative to the total amount of the solvent in the non-aqueous electrolyte. In addition, the volume percent is usually 90% or less, preferably 85% or less, and more preferably 80% or less. By making the content of the linear carbonates within the above ranges, it is easy to make the viscosity of the non-aqueous electrolyte in an appropriate range, suppress the decrease in ion conductivity, and thus contribute to making the output characteristics of the non-aqueous electrolyte battery reach a good range. When two or more linear carbonates are used in combination, the total amount of the linear carbonates needs to satisfy the above ranges.

In some embodiments, linear carbonates having fluorine atoms (hereinafter simply referred to as "fluorinated linear carbonates") may further be preferably used. The number of fluorine atoms in the fluorinated linear carbonates is not particularly limited as long as it is 1 or more, but is usually 6 or less, and preferably 4 or less. When the fluorinated linear carbonates have a plurality of fluorine atoms, the fluorine atoms may be bonded to the same carbon or to different carbons. Examples of the fluorinated linear carbonates include fluorinated dimethyl carbonate derivatives, fluorinated ethyl methyl carbonate derivatives, and fluorinated diethyl carbonate derivatives.

The carboxylate solvent includes cyclic carboxylates and/or linear carbonates. Examples of the cyclic carboxylates include one or more of γ-butyrolactone, γ-valerolactone, and δ-valerolactone. Examples of the linear carbonates include one or more of methyl acetate (MA), ethyl acetate (EA), propyl acetate (EP), butyl acetate, propyl propionate (PP), and butyl propionate.

In some embodiments, the sulfone solvent includes cyclic sulfones and linear sulfones. Preferably, in the case of the cyclic sulfones, they usually have 3 to 6 carbon atoms, and preferably 3 to 5 carbon atoms. In the case of the linear sulfones, they are usually a compound having 2 to 6 carbon atoms, and preferably a compound having 2 to 5 carbon atoms. The addition amount of the sulfone solvent is not particularly limited, and it is arbitrary within a range of not significantly destroying the effect of the lithium-ion battery in the present disclosure. With respect to the total amount of the solvent in the non-aqueous electrolyte, the volume percent of the sulfone solvent is usually 0.3% or more, preferably 0.5% or more, more preferably 1% or more, in addition, usually 40% or less, preferably 35% or less, and more preferably 30% or less. When using two or more sulfone solvents in combination, the total amount of the sulfone solvents needs to satisfy the above ranges. When the addition amount of the sulfone solvent is within the above ranges, an electrolyte having excellent high-temperature storage stability tends to be obtained.

In preferred embodiments, the solvent is a mixture of cyclic carbonates and linear carbonates.

In some embodiments, the non-aqueous electrolyte further includes lithium salts including one or more of $LiPF_6$, LiBOB, LiDFOB, $LiPO_2F_2$, $LiBF_4$, $LiSbF_6$, $LiAsF_6$, $LiN(SO_2CF_3)_2$, $LiN(SO_2C_2F_5)_2$, $LiC(SO_2CF_3)_3$, $LiN(SO_2F)_2$, $LiClO_4$, $LiAlCl_4$, $LiCF_3SO_3$, $Li_2B_{10}Cl_{10}$, and lithium salts of lower aliphatic carboxylates.

In preferred embodiments, the lithium salts include $LiPF_6$ and auxiliary lithium salts, and the auxiliary lithium salts include one or more of LiBOB, LiDFOB, $LiPO_2F_2$, $LiBF_4$, $LiSbF_6$, $LiAsF_6$, $LiN(SO_2CF_3)_2$, $LiN(SO_2C_2F_3)_2$, $LiC(SO_2CF_3)_3$, $LiN(SO_2F)_2$, $LiClO_4$, $LiAlCH_4$, $LiCF_3SO_3$, $Li_2B_{10}Cl_{10}$, and lithium salts of lower aliphatic carboxylates.

Under the above conditions, adding $LiPF_6$ as the main lithium salt in the non-aqueous electrolyte, in combination with the above-mentioned auxiliary lithium salts can further improve the thermal shock resistance of the battery. It is presumed that the compound represented by the formula II contained in the positive electrode is dissolved in a small amount in the non-aqueous electrolyte, and the combination with the above lithium salts has the effect of improving the stability of the non-aqueous electrolyte and avoiding the decomposition of the non-aqueous electrolyte to produce a gas.

In some embodiments, the concentration of the lithium salt in the non-aqueous electrolyte is from 0.1 mol/L to 8 mol/L. In preferred embodiments, the concentration of the electrolyte salt in the non-aqueous electrolyte is from 0.5 mol/L to 4 mol/L. Specifically, the concentration of the lithium salt can be 0.5 mol/L, 1 mol/L, 1.5 mol/L, 2 mol/L, 2.5 mol/L, 3 mol/L, 3.5 mol/L or 4 mol/L.

In some embodiments, in the non-aqueous electrolyte, a mass percent content of the $LiPF_6$ is from 5% to 20%, and a mass percent content of the auxiliary lithium salts is from 0.05% to 5%.

In some embodiments, the non-aqueous electrolyte further includes an additive including at least one of a cyclic sulfate ester compound, a sultone ester compound, a cyclic carbonate ester compound, an unsaturated phosphate ester compound, and a nitrile compound.

Preferably, the cyclic sulfate ester compound is selected from at least one of vinyl sulfate, propylene sulfate, or methyl vinyl sulfate.

The sultone ester compound is selected from at least one of 1,3-propane sultone, 1,4-butane sultone or 1,3-propene sultone.

The cyclic carbonate ester compound is selected from at least one of vinylene carbonate, vinyl ethylene carbonate, fluoroethylene carbonate or a compound represented by formula III, Formula III

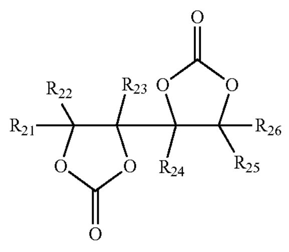

where in the formula III, $R_{21}$, $R_{22}$, $R_{23}$, $R_{24}$, $R_{25}$, and $R_{26}$ are each independently selected from one of a hydrogen atom, a halogen atom, and a C1 to C5 group.

The unsaturated phosphate ester compound is selected from at least one of compounds represented by formula IV:

Formula IV

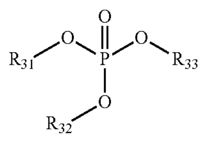

where in the formula IV, $R_{31}$, $R_{32}$ and $R_{33}$ are each independently selected from a C1 to C5 saturated hydrocarbonyl group, an unsaturated hydrocarbonyl group, a halogenated hydrocarbonyl group, and —Si$(C_mH_{2m+1})_3$, where m is a natural number from 1 to 3, and at least one of $R_{31}$, $R_{32}$ and $R_{33}$ is the unsaturated hydrocarbonyl group.

In preferred embodiments, the unsaturated phosphate ester compound may be at least one of tripropargyl phosphate, dipropargyl methyl phosphate, dipropargyl ethyl phosphate, dipropargyl propyl phosphate, dipropargyl trifluoromethyl phosphate, dipropargyl 2,2,2-trifluoroethyl phosphate, dipropargyl 3,3,3-trifluoropropyl phosphate, dipropargyl hexafluoroisopropyl phosphate, triallyl phosphate, diallyl methyl phosphate, diallyl ethyl phosphate, diallyl propyl phosphate, diallyl trifluoromethyl phosphate, diallyl 2,2,2-trifluoroethyl phosphate, diallyl-3,3,3-trifluoropropyl phosphate, and diallyl hexafluoroisopropyl phosphate.

The nitrile compound includes one or more of succinonitrile, glutaronitrile, ethylene glycol bis(propionitrile) ether, hexanetrinitrile, adiponitrile, pimelonitrile, suberonitrile, azelanitrile, and sebaconitrile.

In some other embodiments, the additive may further include other additives that can improve battery performance: for example, additives that improve battery safety performance, such as fluorophosphate esters, cyclophosphazene, and other flame retardant additives, or tert-amylbenzene: tert-butylbenzene and other anti-overcharge additives.

It should be noted that, unless otherwise specified, in general, the addition amount of any optional substance in the additive in the non-aqueous electrolyte is 10% or less, for example, the additive is added in an amount ranging from 0.05 to 10% in the non-aqueous electrolyte. Preferably, the addition amount is from 0.1 to 5%, and more preferably, the addition amount is from 0.1% to 2%. Specifically, the addition amount of any optional substance in the additive can be 0.05%, 0.08%, 0.1%, 0.5%, 0.8%, 1%, 1.2%, 1.5%, 1.8%, 2%, 2.2%, 2.5%, 2.8%, 3%, 3.2%, 3.5%, 3.8%, 4%, 4.5%, 5%, 5.5%, 6%, 6.5%, 7%, 7.5%, 7.8%, 8%, 8.5%, 9%, 9.5%, or 10%.

In some embodiments, when the additive is selected from fluoroethylene carbonate, with a total mass of the non-aqueous electrolyte being 100%, the addition amount of fluoroethylene carbonate is from 0.05% to 30%.

In some embodiments, the negative electrode sheet includes a negative electrode material layer including a negative electrode active material. The negative electrode active material is selected from at least one of a silicon-based negative electrode, a carbon-based negative electrode, a lithium-based negative electrode, and a tin-based negative electrode.

The silicon-based negative electrode includes one or more of silicon materials, silicon oxides, silicon-carbon composite materials, and silicon alloy materials. The carbon-based negative electrode includes one or more of graphite, hard carbon, soft carbon, graphene, and intermediate phase carbon microspheres. The lithium-based negative electrode includes one or more of metal lithium or a lithium alloy. The lithium alloy may specifically be at least one of a lithium-silicon alloy, a lithium-sodium alloy, a lithium-potassium alloy, a lithium-aluminum alloy, a lithium-tin alloy and a lithium-indium alloy. The tin-based negative electrode includes one or more of tin, tin carbon, tin oxide, and tin metal compounds.

In some embodiments, the negative electrode material layer further includes a negative electrode binder and a negative electrode conductive agent. The negative electrode active material, the negative electrode binder and the negative electrode conductive agent are blended to obtain the negative electrode material layer.

The selectable compounds of the negative electrode binder and the negative electrode conductive agent are the same as those of the positive electrode binder and the positive electrode conductive agent respectively, and will not be repeated here.

In some embodiments, the negative electrode sheet further includes a negative electrode current collector, and the negative electrode material layer is formed on a surface of the negative electrode current collector.

The negative electrode current collector is selected from metal materials that can conduct electrons. Preferably, the negative electrode current collector includes one or more of Al, Ni, tin, copper, and stainless steel. In more preferred embodiments, the negative electrode current collector is selected from copper foil.

In some embodiments, the lithium-ion battery further includes a separator, and the separator is located between the positive electrode sheet and the negative electrode sheet.

The separator can be an existing conventional separator, and can be a polymer separator, non-woven fabric and so on, including but not limited to single-layer PP (polypropylene), single-layer PE (polyethylene), double-layer PP/PE, double-layer PP/PP and triple-layer PP/PE/PP separators, and the like.

The present disclosure is further illustrated by way of examples below.

The compounds involved in the following Examples and Comparative Examples are shown in Table 1 below.

TABLE 1

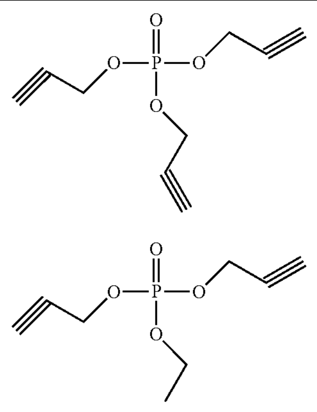

Compound 1

Compound 2

TABLE 1-continued

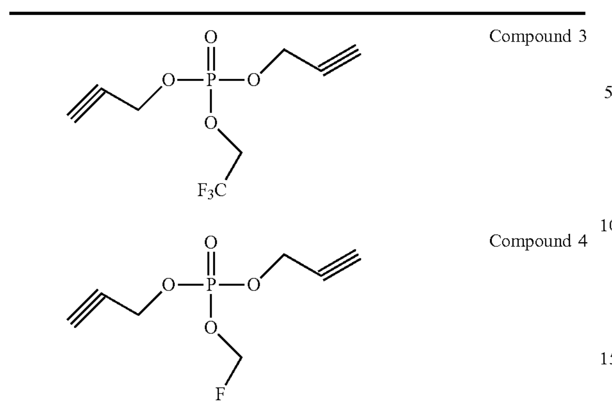

Compound 3

Compound 4

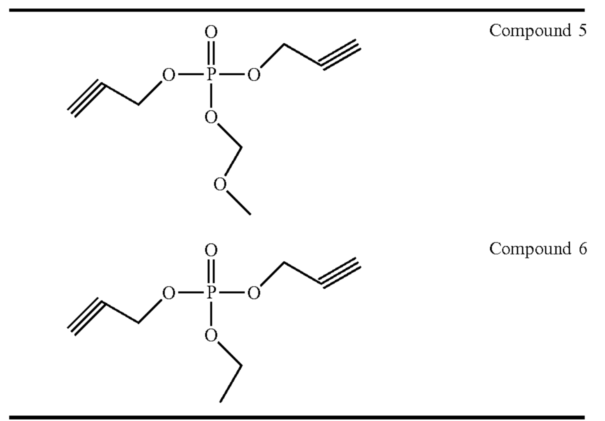

Compound 5

Compound 6

TABLE 2

Design of parameters in Examples and Comparative Examples

| Examples/ Comparative Examples | Positive electrode sheet: Positive electrode active material type | Compound of formula II | Mass content b of compound of formula II (%) | Molar ratio of Ni element: (Ni element + Co element + M element) | Thickness h of positive electrode material layer (μm) | (b/10) * (h/x) | Electrolyte additive and content |
|---|---|---|---|---|---|---|---|
| Example 1 | $LiNi_{0.8}Co_{0.1}Mn_{0.1}O_2$ | Compound 1 | 0.2 | 0.8 | 110 | 2.75 | — |
| Example 2 | $LiNi_{0.8}Co_{0.1}Mn_{0.1}O_2$ | Compound 1 | 0.005 | 0.8 | 80 | 0.05 | — |
| Example 3 | $LiNi_{0.8}Co_{0.1}Mn_{0.1}O_2$ | Compound 1 | 0.01 | 0.8 | 90 | 0.11 | — |
| Example 4 | $LiNi_{0.8}Co_{0.1}Mn_{0.1}O_2$ | Compound 1 | 0.03 | 0.8 | 140 | 0.53 | — |
| Example 5 | $LiNi_{0.8}Co_{0.1}Mn_{0.1}O_2$ | Compound 1 | 0.05 | 0.8 | 140 | 0.88 | — |
| Example 6 | $LiNi_{0.8}Co_{0.1}Mn_{0.1}O_2$ | Compound 1 | 0.1 | 0.8 | 130 | 1.63 | — |
| Example 7 | $LiNi_{0.8}Co_{0.1}Mn_{0.1}O_2$ | Compound 1 | 0.5 | 0.8 | 100 | 6.25 | — |
| Example 8 | $LiNi_{0.8}Co_{0.1}Mn_{0.1}O_2$ | Compound 1 | 1 | 0.8 | 120 | 15.00 | — |
| Example 9 | $LiNi_{0.8}Co_{0.1}Al_{0.1}O_2$ | Compound 1 | 0.1 | 0.8 | 120 | 1.50 | — |
| Example 10 | $LiNi_{0.7}Co_{0.1}Mn_{0.2}O_2$ | Compound 1 | 0.02 | 0.7 | 130 | 0.37 | — |
| Example 11 | $LiNi_{0.7}Co_{0.1}Mn_{0.2}O_2$ | Compound 1 | 0.2 | 0.7 | 110 | 3.14 | — |
| Example 12 | $LiNi_{0.85}Co_{0.05}Mn_{0.1}O_2$ | Compound 1 | 0.05 | 0.85 | 140 | 0.82 | — |
| Example 13 | $LiNi_{0.9}Co_{0.05}Mn_{0.05}O_2$ | Compound 1 | 0.3 | 0.9 | 120 | 4.00 | — |
| Example 14 | $LiNiO_2$ | Compound 1 | 0.5 | 1 | 130 | 6.50 | — |
| Example 15 | $LiNi_{0.75}Mn_{0.25}O_2$ | Compound 1 | 0.08 | 0.75 | 100 | 1.07 | — |
| Example 16 | $LiNi_{0.8}Co_{0.1}Mn_{0.1}O_2$ | Compound 1 | 0.1 | 0.8 | 110 | 1.38 | — |
| Example 17 | $LiNi_{0.8}Co_{0.1}Mn_{0.1}O_2$ | Compound 1 | 0.1 | 0.8 | 110 | 1.38 | VC: 1% |
| Example 18 | $LiNi_{0.8}Co_{0.1}Mn_{0.1}O_2$ | Compound 1 | 0.1 | 0.8 | 110 | 1.3 | DTD: 1% |
| Example 19 | $LiNi_{0.8}Co_{0.1}Mn_{0.1}O_2$ | Compound 1 | 0.1 | 0.8 | 110 | 1.38 | PS: 1% |
| Example 20 | $LiNi_{0.8}Co_{0.1}Mn_{0.1}O_2$ | Compound 2 | 0.1 | 0.8 | 110 | 1.38 | — |
| Example 21 | $LiNi_{0.8}Co_{0.1}Mn_{0.1}O_2$ | Compound 3 | 0.1 | 0.8 | 110 | 1.38 | — |
| Example 22 | $LiNi_{0.8}Co_{0.1}Mn_{0.1}O_2$ | Compound 4 | 0.1 | 0.8 | 110 | 1.38 | — |
| Example 23 | $LiNi_{0.8}Co_{0.1}Mn_{0.1}O_2$ | Compound 5 | 0.1 | 0.8 | 110 | 1.38 | — |
| Comparative Example 1 | $LiNi_{0.8}Co_{0.1}Mn_{0.1}O_2$ | None | — | 0.8 | 110 | — | — |
| Comparative Example 2 | $LiNi_{0.8}Co_{0.1}Mn_{0.1}O_2$ | None | — | 0.8 | 80 | — | |
| Comparative Example 3 | $LiNi_{0.8}Co_{0.1}Mn_{0.1}O_2$ | None | — | 0.8 | 90 | — | |
| Comparative Example 4 | $LiNi_{0.8}Co_{0.1}Mn_{0.1}O_2$ | None | — | 0.8 | 120 | — | |
| Comparative Example 5 | $LiNi_{0.8}Co_{0.1}Mn_{0.1}O_2$ | None | — | 0.8 | 140 | — | — |
| Comparative Example 6 | $LiNi_{0.8}Co_{0.1}Mn_{0.1}O_2$ | None | — | 0.8 | 130 | — | — |
| Comparative Example 7 | $LiNi_{0.8}Co_{0.1}Mn_{0.1}O_2$ | None | — | 0.8 | 100 | — | — |
| Comparative Example 8 | $LiNi_{0.8}Co_{0.1}Mn_{0.1}O_2$ | None | — | 0.8 | 120 | — | — |
| Comparative Example 9 | $LiNi_{0.5}Co_{0.2}Mn_{0.3}O_2$ | Compound 1 | 0.1 | 0.5 | 110 | 2.20 | — |
| Comparative Example 10 | $LiNi_{0.5}Co_{0.2}Mn_{0.3}O_2$ | None | — | 0.5 | 110 | — | — |

TABLE 2-continued

Design of parameters in Examples and Comparative Examples

| Examples/ Comparative Examples | Positive electrode sheet | | | | | | Electrolyte additive and content |
|---|---|---|---|---|---|---|---|
| | Positive electrode active material type | Compound of formula II | Mass content b of compound of formula II (%) | Molar ratio of Ni element: (Ni element + Co element + M element) | Thickness h of positive electrode material layer (μm) | (b/10) * (h/x) | |
| Comparative Example 11 | $LiNi_{0.6}Co_{0.2}Mn_{0.2}O_2$ | Compound 1 | 0.1 | 0.6 | 110 | 1.83 | — |
| Comparative Example 12 | $LiNi_{0.6}Co_{0.2}Mn_{0.2}O_2$ | None | — | 0.6 | 110 | — | — |
| Comparative Example 13 | $LiNi_{0.8}Co_{0.1}Mn_{0.1}O_2$ | None | — | 0.8 | 110 | — | Compound 1: 0.5% |
| Comparative Example 14 | $LiNi_{0.8}Co_{0.1}Mn_{0.1}O_2$ | Compound 1 | 0.003 | 0.8 | 140 | 0.05 | — |
| Comparative Example 15 | $LiNi_{0.8}Co_{0.1}Mn_{0.1}O_2$ | Compound 1 | 1.2 | 0.8 | 80 | 12.00 | — |
| Comparative Example 16 | $LiNi_{0.8}Co_{0.1}Mn_{0.1}O_2$ | Compound 1 | 0.4 | 0.9 | 70 | 3.11 | — |
| Comparative Example 17 | $LiNi_{0.8}Co_{0.1}Mn_{0.1}O_2$ | Compound 1 | 0.4 | 0.9 | 160 | 7.11 | — |
| Comparative Example 18 | $LiNi_{0.8}Co_{0.1}Mn_{0.1}O_2$ | Compound 1 | 0.005 | 0.9 | 80 | 0.04 | — |
| Comparative Example 19 | $LiNi_{0.8}Co_{0.1}Mn_{0.1}O_2$ | Compound 1 | 1 | 0.7 | 130 | 18.57 | — |
| Comparative Example 20 | $LiNi_{0.8}Co_{0.1}Mn_{0.1}O_2$ | Compound 1 | 0.9 | 0.8 | 150 | 16.88 | — |
| Comparative Example 21 | $LiNi_{0.8}Co_{0.1}Mn_{0.1}O_3$ | Compound 1 | 0.9 | 0.8 | 140 | 15.75 | — |
| Comparative Example 22 | $LiNi_{0.8}Co_{0.1}Mn_{0.1}O_2$ | None | — | 0.8 | 110 | — | — |
| Comparative Example 23 | $LiNi_{0.8}Co_{0.1}Mn_{0.1}O_2$ | None | — | 0.8 | 110 | — | VC: 1% |
| Comparative Example 24 | $LiNi_{0.8}Co_{0.1}Mn_{0.1}O_2$ | None | — | 0.8 | 110 | — | DTD: 1% |
| Comparative Example 25 | $LiNi_{0.8}Co_{0.1}Mn_{0.1}O_2$ | None | — | 0.8 | 110 | — | PS: 1% |

Example 1

This example is used to illustrate the lithium-ion battery disclosed in the present disclosure and its preparation method, including the steps as follows:

1) Preparation of Positive Electrode Sheet

Step 1: PVDF as a binder and the compound represented by the formula II shown in Table 2 were added to an NMP solvent, and stirred thoroughly and uniformly to obtain a PVDF glue solution added with the compound represented by the formula II.

Step 2: A conductive agent (super P+CNT) was added to the PVDF glue solution, and stirred thoroughly and uniformly.

Step 3: The positive electrode active material shown in Table 2 was subsequently added, and stirred thoroughly and uniformly, finally obtaining the desired positive electrode slurry.

Step 4: The prepared positive electrode slurry was evenly coated on the positive electrode current collector (for example, aluminum foil), and the positive electrode sheet was obtained by drying, rolling, die-cutting or slitting, in which the thickness of the positive electrode material layer formed on one side of the positive electrode current collector is shown in Table 2.

2) Preparation of Negative Electrode Sheet

Step 1: Materials were weighed according to a ratio of graphite (Shanghai Shanshan, FSN-1):conductive carbon (super P):sodium carboxymethyl cellulose (CMC):styrene-butadiene rubber (SBR)=96.3:1.0:1.2:1.5 (mass ratio).

Step 2: CMC was added into pure water at a solid content of 1.5%, and stirred thoroughly and uniformly (for example, for a stirring time period of 120 min) to prepare a transparent CMC glue solution.

Step 3: Conductive carbon (super P) was added to the CMC glue solution, and stirred thoroughly and uniformly (for example, for a stirring time period of 90 min) to prepare a conductive glue solution.

Step 4: Graphite was subsequently added, and stirred thoroughly and uniformly, finally obtaining the required negative electrode slurry.

Step 5: The prepared negative electrode slurry was evenly coated on the copper foil, and the negative electrode sheet was obtained by drying, rolling, die-cutting or slitting.

3) Preparation of Non-Aqueous Electrolyte

Ethylene carbonate (EC), diethyl carbonate (DEC) and ethyl methyl carbonate (EMC) were mixed according to a mass ratio of EC:DEC:EMC=1:1:1, and then lithium hexafluorophosphate ($LiPF_6$) and lithium difluorophosphate ($LiPO_2F_2$) were added, in which the molar concentration of $LiPF_6$ is 1 mol/L, and the content of $LiPO_2F_2$ is 1%.

4) Preparation of Lithium-Ion Battery Cell

The above-mentioned prepared positive electrode sheet and the above-mentioned negative electrode sheet were assembled into a laminated soft-packed battery cell.

5) Injection and Formation of Battery Cell

In a glove box with a dew point controlled at −40° C. or less, the above-prepared electrolyte was injected into the battery cell, sealed under vacuum, and subjected to standing for 24 hours. Then the normal formation of a first charging is performed according to the following steps: charging at a constant current of 0.05 C for 180 min, charging at a constant current of 0.2 C to 3.95 V, second sealing under vacuum, and then further charging at a constant current of 0.2 C to 4.2V. After standing at room temperature for 24 hours, it was discharged to 3.0 V at a constant current of 0.2 C.

Examples 2 to 26

Examples 2 to 23 are used to illustrate the lithium-ion battery disclosed in the present disclosure and its preparation method, including most of the operation steps in Example 1, with the exceptions as follows: the positive electrode sheet components and electrolyte additive components shown in Table 2 are used.

Comparative Examples 1 to 25

Comparative Examples 1 to 25 are used to comparatively illustrate the lithium-ion battery disclosed in the present disclosure and its preparation method, including most of the operating steps in Example 1, with the exceptions as follows: the positive electrode sheet components and electrolyte additive components shown in Table 2 are used.

Performance Testing

The performance of the lithium-ion batteries prepared above is tested as follows:

The prepared lithium-ion battery was placed in an oven with a constant temperature of 45° C., charged at a constant current of 1 C to 4.2 V, then charged at a constant current and a constant voltage until the current drops to 0.05 C, then discharged at a constant current of 1 C to 3.0 V, so as to circulate in this way. The initial discharge capacity and internal resistance in the first cycle were recorded. When the discharge capacity of the battery drops to 80% of the initial discharge capacity, the number of cycles of the battery was recorded.

(1) The test results obtained in Examples 1 to 8 and Comparative Examples 1 to 21 are shown in Table 3.

TABLE 3

| Examples/ Comparative Examples | Battery initial capacity (mAh) | Initial impedance (ohm) | Number of cycles at 45° C. |
|---|---|---|---|
| Example 1 | 1120 | 8 | 1540 |
| Example 2 | 1072 | 9.8 | 1468 |
| Example 3 | 1084 | 9.4 | 1487 |
| Example 4 | 1090 | 9.2 | 1495 |
| Example 5 | 1096 | 9 | 1503 |
| Example 6 | 1115 | 8.2 | 1532 |
| Example 7 | 1111 | 8.4 | 1526 |
| Example 8 | 1078 | 9.6 | 1474 |
| Comparative Example 1 | 1018 | 16.9 | 999 |
| Comparative Example 2 | 1000 | 15.8 | 1036 |
| Comparative Example 3 | 1006 | 16.3 | 1028 |
| Comparative Example 4 | 1048 | 17.9 | 970 |
| Comparative Example 5 | 1043 | 18.1 | 964 |
| Comparative Example 6 | 1039 | 17.6 | 983 |
| Comparative Example 7 | 1012 | 16.7 | 1022 |
| Comparative Example 8 | 1024 | 17.2 | 991 |
| Comparative Example 9 | 949 | 9.7 | 1387 |
| Comparative Example 10 | 845 | 13.4 | 1183 |
| Comparative Example 11 | 984 | 11.6 | 1339 |

TABLE 3-continued

| Examples/ Comparative Examples | Battery initial capacity (mAh) | Initial impedance (ohm) | Number of cycles at 45° C. |
|---|---|---|---|
| Comparative Example 12 | 901 | 14.7 | 1127 |
| Comparative Example 13 | 1029 | 15.8 | 1054 |
| Comparative Example 14 | 1032 | 13.5 | 1258 |
| Comparative Example 15 | 1022 | 13.9 | 1249 |
| Comparative Example 16 | 1002 | 14.6 | 1230 |
| Comparative Example 17 | 1012 | 14.3 | 1238 |
| Comparative Example 18 | 995 | 14.9 | 1221 |
| Comparative Example 19 | 1016 | 14.4 | 1240 |
| Comparative Example 20 | 1025 | 13.8 | 1253 |
| Comparative Example 21 | 1038 | 13.1 | 1271 |

As can be seen from the test results of Examples 1 to 8 and Comparative Examples 1 to 21, in the case of the same type of the positive electrode active material for lithium-ion batteries, when the mass percent content b of the compound represented by the formula II in the positive electrode material layer, the molar ratio x of the Ni element: (Ni element+Co element+M element) in the high-nickel positive electrode material and the thickness h of the positive electrode material layer on one side of the positive electrode current collector satisfy the preset relationship $0.05 \leq (b/10)*(h/x) \leq 15$, the lithium-ion battery has excellent impedance, high-temperature cycling performance and initial capacity performance at the same time. It is speculated that the compound represented by the formula II has a relatively good synergistic effect with the high-nickel positive electrode material under the this condition, forming a relatively stable interfacial film on the surface of the high-nickel positive electrode material, and improving the structural stability and oxidation resistance of the high-nickel positive electrode material. It also forms an effective isolation between the non-aqueous electrolyte and the high-nickel positive electrode material, reducing the continuous decomposition of the non-aqueous electrolyte, and thus ensuring the consistency of the thickness of the interfacial film of the high-nickel positive electrode material. The interfacial film of this thickness has lower impedance and better high-temperature stability, thereby improving the high-temperature cycling life of the lithium-ion battery.

As can be seen from the test results of Examples 1 to 8, with the increase in the $(b/10)*(h/x)$ value, the initial capacity: the high-temperature cycling performance and impedance performance of the lithium-ion secondary battery increase first and then decrease, indicating that the mass percent content b of the compound represented by the formula II in the positive electrode material layer, the molar ratio x of the Ni element: (Ni element+Co element+M element) in the high-nickel positive electrode material and the thickness h of the positive electrode material layer on one side of the positive electrode current collector are related to the electrochemical performance of lithium-ion battery: Especially, when $0.08 \leq (b/10)*(h/x) \leq 8$, the lithium-ion secondary battery has the best initial capacity, high-temperature cycling performance and thermal shock resistance.

As can be seen from the test results of Comparative Examples 1 to 8, 10 and 12, when the compound represented by the formula 1 is not added to the positive electrode sheet, the molar content of Ni in the positive electrode sheet in the lithium-ion secondary battery is relatively high. With the same thickness of the positive electrode active layer, the battery has higher energy density but poor internal resistance and cycling performance. Secondly, under the same molar content of the Ni element in the positive electrode sheet, the thickness of the positive electrode active layer is positively correlated with the energy density and negatively correlated with the impedance, indicating that the thickness of the positive electrode active layer will directly affect the internal resistance and cycling performance of the battery. As can be seen from the test results of Comparative Examples 9, 11, and 14 to 17, the compound represented by the formula 1 is added to the positive electrode sheet, even if the relationship of the mass percent content b of the compound represented by the formula II in the positive electrode material layer with the molar ratio x of the Ni element: (Ni element+Co element+M element) in the high-nickel positive electrode material and the thickness h of the positive electrode material layer on one side of the positive electrode current collector satisfies the condition $0.05 \leq (b/10)*(h/x) \leq 15$. However, when the b value, x value, and h value do not satisfy the range limits, the lithium-ion battery still does not have relatively good electrochemical performance.

As can be seen from the test results of Comparative Example 13 and Example 1, when the compound represented by the formula II is added to the non-aqueous electrolyte, the performance improvement of the battery is much less than that when the compound represented by the formula II is added to the positive electrode material layer. This may be because of the higher viscosity and lower conductivity of the compound represented by the formula II. Adding the compound represented by the formula II to the electrolyte will affect the capacity, internal resistance and cycling performance of the battery.

(2) The test results obtained in Examples 9-15 are shown in Table 4.

TABLE 4

| Examples/ Comparative Examples | Battery initial capacity (mAh) | Initial impedance (ohm) | Number of cycles at 45° C. |
|---|---|---|---|
| Example 9 | 1110 | 8.5 | 1531 |
| Example 10 | 1052 | 10.4 | 1432 |
| Example 11 | 1063 | 10.1 | 1448 |
| Example 12 | 1145 | 10.7 | 1422 |
| Example 13 | 1176 | 10.9 | 1403 |
| Example 14 | 1011 | 11.3 | 1375 |
| Example 15 | 1032 | 11.1 | 1398 |

As can be seen from the test results of Examples 9 to 15, other high-nickel materials (X=0.7, 0.75, 0.85, 0.9, 1) are used as positive electrode active materials. When the mass percent content b of the compound represented by the formula II in the positive electrode material layer, the molar ratio x of the Ni element: (Ni element+Co element+M element) in the high-nickel positive electrode material and the thickness h of the positive electrode material layer on one side of the positive electrode current collector satisfy the preset relationship $0.05 \leq (b/10)*(h/x) \leq 15$, the battery also has better high-temperature cycling performance and initial capacity, indicating that the relationship provided in the present disclosure is universal for the improvement of the high-temperature performance of lithium-ion batteries using different high-nickel positive electrode materials.

(3) The test results obtained in Examples 16 to 19 and Comparative Examples 22 to 25 are shown in Table 5.

TABLE 5

| Examples/ Comparative Examples | Battery initial capacity (mAh) | Initial impedance (ohm) | Number of cycles at 45° C. |
|---|---|---|---|
| Example 16 | 1052 | 10.6 | 1436 |
| Example 17 | 1116 | 8.2 | 1535 |
| Example 18 | 1112 | 8.4 | 1530 |
| Example 19 | 1096 | 8.8 | 1522 |
| Comparative Example 22 | 1000 | 19.2 | 901 |
| Comparative Example 23 | 1015 | 17.2 | 993 |
| Comparative Example 24 | 1011 | 17.6 | 987 |
| Comparative Example 25 | 1003 | 18 | 980 |

As can be seen from the test results of Examples 16 to 19 and Comparative Examples 22 to 25, in the battery containing the positive electrode provided in the present disclosure, the addition of the above-mentioned additives DTD (ethylene sulfate), VC (vinyl carbonate) or PS (1,3-propane sultone) to the non-aqueous electrolyte can further improve the high-temperature cycling performance of the battery, and reduce the maximum surface temperature of the battery in the thermal shock test. It is presumed that the compound represented by the formula 1 in the positive electrode and the above-mentioned additives jointly participate in the forming of the passivation film on the electrode surface to obtain a passivation film with excellent thermal stability, thereby effectively reducing the reaction of the electrolyte on the electrode surface and improving the electrochemical performance of the battery.

(4) The test results obtained in Examples 20 to 23 are shown in Table 6.

TABLE 6

| Examples/ Comparative examples | Battery initial capacity (mAh) | Initial impedance (ohm) | Number of cycles at 45° C. |
|---|---|---|---|
| Example 20 | 1118 | 8.1 | 1538 |
| Example 21 | 1107 | 8.6 | 1527 |
| Example 22 | 1111 | 8.3 | 1531 |
| Example 23 | 1103 | 8.9 | 1522 |

As can be seen from the test results of Examples 20 to 23, for different compounds represented by the formula 1, when the mass percent content b of the compound represented by the formula II in the positive electrode material layer, the molar ratio x of the Ni element: (Ni element+Co element+M element) in the high-nickel positive electrode material and the thickness h of the positive electrode material layer on one side of the positive electrode current collector satisfy the preset relationship $0.05 \leq (b/10)*(h/x) \leq 15$, it plays a similar role, having a certain improvement effect on the battery capacity and cycling performance of lithium-ion batteries, indicating that the relationship provided in the present disclosure is applicable to different compounds represented by the formula 1.

The above descriptions are only preferred embodiments of the present disclosure, and are not intended to limit the present disclosure. Any modifications, equivalent replacements and improvements made within the range of spirit and principles of the present disclosure should be included in the protection scope of the present disclosure.

What is claimed is:

1. A positive electrode sheet, comprising:

a positive electrode current collector; and a positive electrode material layer formed on the positive electrode current collector, wherein the positive electrode material layer comprises a high-nickel positive electrode material represented by formula I and a compound represented by formula II:

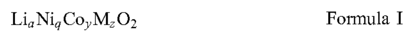

$Li_aNi_qCo_yM_zO_2$ Formula I where $0.9 \leq a \leq 1.2$, $0.7 \leq q \leq 1$, $y \geq 0$, $z \geq 0$, and $q+y+z=1$, wherein M is selected from one or both of Mn and Al;

Formula II

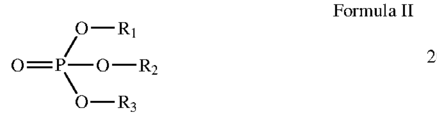

where $R_1$, $R_2$, and $R_3$ are each independently selected from an alkyl group of 1 to 5 carbon atoms, a fluoroalkyl group of 1 to 5 carbon atoms, an ether group of 1 to 5 carbon atoms, a fluoroether group of 1 to 5 carbon atoms, an unsaturated hydrocarbonyl group of 2 to 5 carbon atoms, and at least one of $R_1$, $R_2$, and $R_3$ is the unsaturated hydrocarbonyl group of 2 to 5 carbon atoms;

wherein the positive electrode sheet satisfies following conditions:

$$0.05 \leq (b/10)*(h/x) \leq 15;$$

and $$0.005 \leq b \leq 1,$$

$$0.7 \leq x \leq 1,$$

$$80 \leq h \leq 140;$$

where b is a mass percent content of the compound represented by the formula II in the positive electrode material layer, in a unit of %;

x is a molar ratio of Ni element: (Ni element+Co element+M element) in the high-nickel positive electrode material; and h is a thickness of the positive electrode material layer on one side of the positive electrode current collector, in a unit of μm;

wherein a solution obtained after ultrasonically shaking the positive electrode sheet in a solvent is subjected to a liquid chromatography-mass spectrometer (LC-MS) analysis, and a characteristic peak appears in a region having a retention time of 6.5 min to 7.5 min.

2. The positive electrode sheet according to claim 1, wherein the positive electrode sheet satisfies a following condition:

$$0.08 \leq (b/10)*(h/x) \leq 8.$$

3. The positive electrode sheet according to claim 1, wherein the mass percent content b of the compound represented by the formula II in the positive electrode material layer is from 0.05% to 0.5%.

4. The positive electrode sheet according to claim 1, wherein the molar ratio x of Ni element: (Ni element+Co element+M element) in the high-nickel positive electrode material is from 0.8 to 0.9.

5. The positive electrode sheet according to claim 1, wherein the thickness h of the positive electrode material layer on one side of the positive electrode current collector is from 100 to 140 μm.

6. The positive electrode sheet according to claim 1, wherein the high-nickel positive electrode material represented by the formula I is selected from at least one of $LiNi_{0.8}Co_{0.1}Mn_{0.1}O_2$, $LiNi_{0.8}Co_{0.1}Al_{0.1}O_2$, $LiNi_{0.81}Co_{0.16}Mn_{0.03}O_2$, $LiNi_{0.81}Co_{0.16}Al_{0.03}O_2$, $LiNi_{0.8}Co_{0.05}Mn_{0.15}O_2$, $LiNi_{0.8}Co_{0.05}Al_{0.15}O_2$, $LiNi_{0.7}Co_{0.1}Mn_{0.2}O_2$, $LiNi_{0.9}Co_{0.05}Mn_{0.05}O_2$, $LiNiO_2$, $LiNi_{0.75}Mn_{0.25}O_2$, or $LiNi_{0.85}Co_{0.05}Mn_{0.1}O_2$.

7. The positive electrode sheet according to claim 1, wherein the mass percent content of the high-nickel positive electrode material represented by the formula I in the positive electrode material layer is from 90.0% to 99.2%.

8. The positive electrode sheet according to claim 1, wherein the alkyl group of 1 to 5 carbon atoms is selected from methyl, ethyl, n-propyl, isopropyl, n-butyl, isobutyl, sec-butyl, tert-butyl, n-pentyl, isopentyl, sec-pentyl, or neopentyl; the fluoroalkyl group of 1 to 5 carbon atoms is selected from a group obtained by substituting one or more hydrogen elements in the alkyl group of 1 to 5 carbon atoms with fluorine elements;

the unsaturated hydrocarbonyl group of 2 to 5 carbon atoms is selected from vinyl, propenyl, allyl, butenyl, pentenyl, methyl vinyl, methyl allyl, ethynyl, propynyl, propargyl, butynyl, or pentynyl;

the ether group of 1 to 5 carbon atoms is selected from methyl ether, ethyl ether, methyl ethyl ether, propyl ether, methyl propyl ether, or ethyl propyl ether; and the fluoroether group of 1 to 5 carbon atoms is selected from fluoromethyl ether, fluoroethyl ether, fluoromethyl ethyl ether, fluoropropyl ether, fluoromethyl propyl ether, or fluoroethyl propyl ether.

9. The positive electrode sheet according to claim 1, wherein the compound represented by the formula II is selected from at least one of tripropargyl phosphate, dipropargyl methyl phosphate, dipropargyl fluoromethyl phosphate, dipropargyl methoxymethyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, dipropargyl methyl ether phosphate, dipropargyl fluoromethyl ether phosphate, diallyl 2,2,2-trifluoroethyl phosphate, diallyl 3,3,3-trifluoropropyl phosphate, or diallyl hexafluoroisopropyl phosphate.

10. A lithium-ion battery, comprising:

a negative electrode sheet, a non-aqueous electrolyte, and a positive electrode sheet comprising:

a positive electrode current collector; and a positive electrode material layer formed on the positive electrode current collector, wherein the positive electrode material layer comprises a high-nickel positive electrode material represented by formula I and a compound represented by formula II:

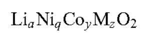

Formula I where $0.9 \leq a \leq 1.2$, $0.7 \leq q \leq 1$, $y \geq 0$, $z \geq 0$, and $q+y+z=1$, wherein M is selected from one or both of Mn and Al;

Formula II

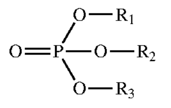

where $R_1$, $R_2$, and $R_3$ are each independently selected from an alkyl group of 1 to 5 carbon atoms, a fluoroalkyl group of 1 to 5 carbon atoms, an ether group of 1 to 5 carbon atoms, a fluoroether group of 1 to 5 carbon atoms, an unsaturated hydrocarbonyl group of 2 to 5 carbon atoms, and at least one of $R_1$, $R_2$, and $R_3$ is the unsaturated hydrocarbonyl group of 2 to 5 carbon atoms;

wherein the positive electrode sheet satisfies following conditions:

$$0.05 \leq (b/10)*(h/x) \leq 15;$$

and $$0.005 \leq b \leq 1,$$

$$0.7 \leq x \leq 1,$$

$$80 \leq h \leq 140;$$

where b is a mass percent content of the compound represented by the formula II in the positive electrode material layer, in a unit of %;

x is a molar ratio of Ni element: (Ni element+Co element+M element) in the high-nickel positive electrode material; and h is a thickness of the positive electrode material layer on one side of the positive electrode current collector, in a unit of μm;

wherein a solution obtained after ultrasonically shaking the positive electrode sheet in a solvent is subjected to a liquid chromatography-mass spectrometer (LC-MS) analysis, and a characteristic peak appears in a region having a retention time of 6.5 min to 7.5 min.

11. The lithium-ion battery according to claim 10, wherein the non-aqueous electrolyte comprises an additive comprising at least one of a cyclic sulfate ester compound, a sultone ester compound, a cyclic carbonate ester compound, an unsaturated phosphate ester compound, and a nitrile compound.

12. The lithium-ion battery according to claim 11, wherein the cyclic sulfate ester compound is selected from at least one of vinyl sulfate, propylene sulfate, or methyl vinyl sulfate;

the sultone ester compound is selected from at least one of 1,3-propane sultone, 1,4-butane sultone or 1,3-propene sultone;

the cyclic carbonate ester compound is selected from at least one of vinylene carbonate, vinyl ethylene carbonate, fluoroethylene carbonate or a compound represented by formula III, Formula III

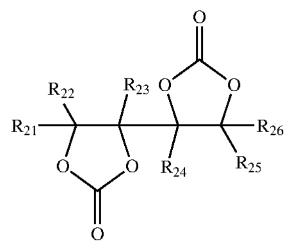

wherein in the formula III, $R_{21}$, $R_{22}$, $R_{23}$, $R_{24}$, $R_{25}$, and $R_{26}$ are each independently selected from one of a hydrogen atom, a halogen atom, and a $C_1$ to $C_5$ group;

the unsaturated phosphate ester compound is selected from at least one of compounds represented by formula IV:

Formula IV

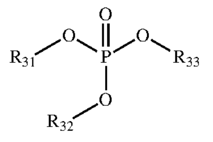

wherein in the formula IV, $R_{31}$, $R_{32}$ and $R_{33}$ are each independently selected from a $C_1$ to $C_5$ saturated hydrocarbonyl group, an unsaturated hydrocarbonyl group, a halogenated hydrocarbonyl group, and $—Si(C_mH_{2m+1})_3$, where m is a natural number from 1 to 3, and at least one of $R_{31}$, $R_{32}$ and $R_{33}$ is the unsaturated hydrocarbonyl group; and the nitrile compound comprises one or more of succinonitrile, glutaronitrile, ethylene glycol bis(propionitrile) ether, hexanetrinitrile, adiponitrile, pimelonitrile, suberonitrile, azelanitrile, and sebaconitrile.

13. The lithium-ion battery according to claim 11, wherein the additive is added in an amount ranging from 0.05 to 10% in the non-aqueous electrolyte.

14. The lithium-ion battery according to claim 10, wherein the mass percent content b of the compound represented by the formula II in the positive electrode material layer is from 0.05% to 0.5%.

15. The lithium-ion battery according to claim 10, wherein the molar ratio x of Ni element: (Ni element+Co element+M element) in the high-nickel positive electrode material is from 0.8 to 0.9.

16. The lithium-ion battery according to claim 10, wherein the thickness h of the positive electrode material layer on one side of the positive electrode current collector is from 100 to 140 μm.

17. The lithium-ion battery according to claim 10, wherein the high-nickel positive electrode material represented by the formula I is selected from at least one of $LiNi_{0.8}Co_{0.1}Mn_{0.1}O_2$, $LiNi_{0.8}Co_{0.1}Al_{0.1}O_2$, $LiNi_{0.81}Co_{0.16}Mn_{0.03}O_2$, $LiNi_{0.81}Co_{0.16}Al_{0.03}O_2$, $LiNi_{0.8}Co_{0.05}Mn_{0.15}O_2$, $LiNi_{0.8}Co_{0.05}Al_{0.15}O_2$, $LiNi_{0.7}Co_{0.1}Mn_{0.2}O_2$, $LiNi_{0.9}Co_{0.05}Mn_{0.05}O_2$, $LiNiO_2$, $LiNi_{0.75}Mn_{0.25}O_2$, or $LiNi_{0.85}Co_{0.05}Mn_{0.1}O_2$.

18. The lithium-ion battery according to claim 10, wherein the mass percent content of the high-nickel positive electrode material represented by the formula I in the positive electrode material layer is from 90.0% to 99.2%.

19. The lithium-ion battery according to claim 10, wherein the compound represented by the formula II is selected from at least one of tripropargyl phosphate, dipropargyl methyl phosphate, dipropargyl fluoromethyl phosphate, dipropargyl methoxymethyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, dipropargyl methyl ether phosphate, dipropargyl fluoromethyl ether phosphate, diallyl 2,2,2-trifluoroethyl phosphate, diallyl 3,3,3-trifluoropropyl phosphate, or diallyl hexafluoroisopropyl phosphate.

20. The positive electrode sheet according to claim 1, wherein:

the compound represented by the formula II is formed on a surface of the positive electrode material layer; or the compound represented by the formula II is mixed in an interior of the positive electrode material layer.

* * * * *